(12) United States Patent
Connor et al.

(10) Patent No.: US 6,934,776 B2
(45) Date of Patent: Aug. 23, 2005

(54) METHODS AND APPARATUS FOR DETERMINATION OF PACKET SIZES WHEN TRANSFERRING PACKETS VIA A NETWORK

(75) Inventors: Patrick L. Connor, Portland, OR (US); Linden Minnick, Hillsboro, OR (US); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 10/196,967

(22) Filed: Jul. 16, 2002

(65) Prior Publication Data

US 2004/0015686 A1 Jan. 22, 2004

(51) Int. Cl.[7] .................................................. G06F 3/00
(52) U.S. Cl. ............................ 710/60; 710/52; 710/29; 370/229; 370/230; 709/233
(58) Field of Search ............................... 710/29, 33–35, 710/52, 56, 58, 60; 370/229, 230; 709/233

(56) References Cited

U.S. PATENT DOCUMENTS

| | | | | |
|---|---|---|---|---|
| 4,159,517 A | * | 6/1979 | Paradine et al. ............... 710/57 |
| 6,145,010 A | * | 11/2000 | Hiscock et al. .............. 709/238 |
| 6,188,695 B1 | * | 2/2001 | Przybysz ..................... 370/410 |
| 6,216,182 B1 | * | 4/2001 | Nguyen et al. ................ 710/48 |
| 6,421,348 B1 | * | 7/2002 | Gaudet et al. ............... 370/401 |
| 6,728,795 B1 | * | 4/2004 | Farazmandnia et al. ...... 710/22 |

* cited by examiner

Primary Examiner—Kim Huynh
(74) Attorney, Agent, or Firm—David N. Tran

(57) ABSTRACT

Two timers are used to improve ingress throughput. Decisions to transfer the ingress packets are made based on when the two timers expire. A first timer is used to time how long a first ingress packet waits before it is transferred. When this first timer expires, the all received ingress packets including the first ingress packet are transferred. A second timer is used to time how long to wait for a new ingress packet to be received. The second timer is reset if a new ingress packet is received before expiration of the second timer. When the second timer expires and no new ingress packet is received during the wait, all received ingress packets including the first ingress packet are transferred.

20 Claims, 7 Drawing Sheets

METHODS AND APPARATUS FOR DETERMINATION OF PACKET SIZES WHEN TRANSFERRING PACKETS VIA A NETWORK

FIELD OF THE INVENTION

The present invention relates to the field of computer networks, more particularly relating to methods and apparatuses for transmitting and/or receiving packets via a network.

BACKGROUND

A computing platform or device, e.g. a device that handles, stores, displays and/or processes data, such as a computer, may transmit and receive data and/or information in packet format between itself and another device over a communications network. The computing device may include a host memory as well as a local bus coupled to a network adapter.

A communications network may include a plurality of interconnected nodes, and may comprise, for example, without limitation, computers, set top boxes, peripherals, servers and/or terminals coupled by communications lines or other communications channels. A communications network may connect or couple nodes over a local area, such as, for example, a campus, or over a wide area, such as, for example, multiple campuses. A network adapter, also generally known as a network controller or network interface card (NIC), may be coupled to a computing device and used to process data received from and/or transmitted to a communications channel.

Such a network adapter may include its own local memory, an input/output (I/O) controller, and a network transceiver. High-speed I/O controllers are often throughput limited at least in part due to the local bus of the computing device. For example, the peripheral component interconnect (PCI) specification, rev. 2.1, issued Jun. 1, 1995, available from www.pcisig.com, describes, in part, associated overhead for memory transfers. A computing device may transfer signals in a manner that complies with this specification. In such a case, memory transfer operations, such as a, direct memory access (DMA) bus transaction, for example, may be inefficient small transfers, such as less than about 1K bytes of data.

Ethernet data packets typically vary from 64 to 1518 bytes in length. However, a majority of Ethernet data packets tends to be small. As previously indicated, memory transfers of these data packets may be inefficient where the signals employed comply with, for example, the PCI specification.

BRIEF DESCRIPTION OF THE DRAWINGS

Subject matter is particularly pointed out and distinctly claimed in the concluding portion of the specification. The subject matter, however, both as to organization and method of operation, together with objects, features, and advantage thereof, may best be understood by reference of the following detailed description when read with the accompanying drawings in which:

DETAILED DESCRIPTION

In accordance with one embodiment of the present invention, timers are used to determine if ingress packets received and stored in a buffer are to be transferred. The decisions to transfer the ingress packets are made based on the expiration of the timers. A first timer is used to determine a length of time a first ingress packet waits in the buffer before it is transferred. When the first timer expires, all ingress packets in the buffer including the first ingress packet are transferred. A second timer is used to determine a length of time to wait for a new ingress packet to be received into the buffer. The second timer is reset if a new ingress packet is received before expiration of the second timer. When the second timer expires, all ingress packets in the buffer including the first ingress packet are transferred.

Figure 1:
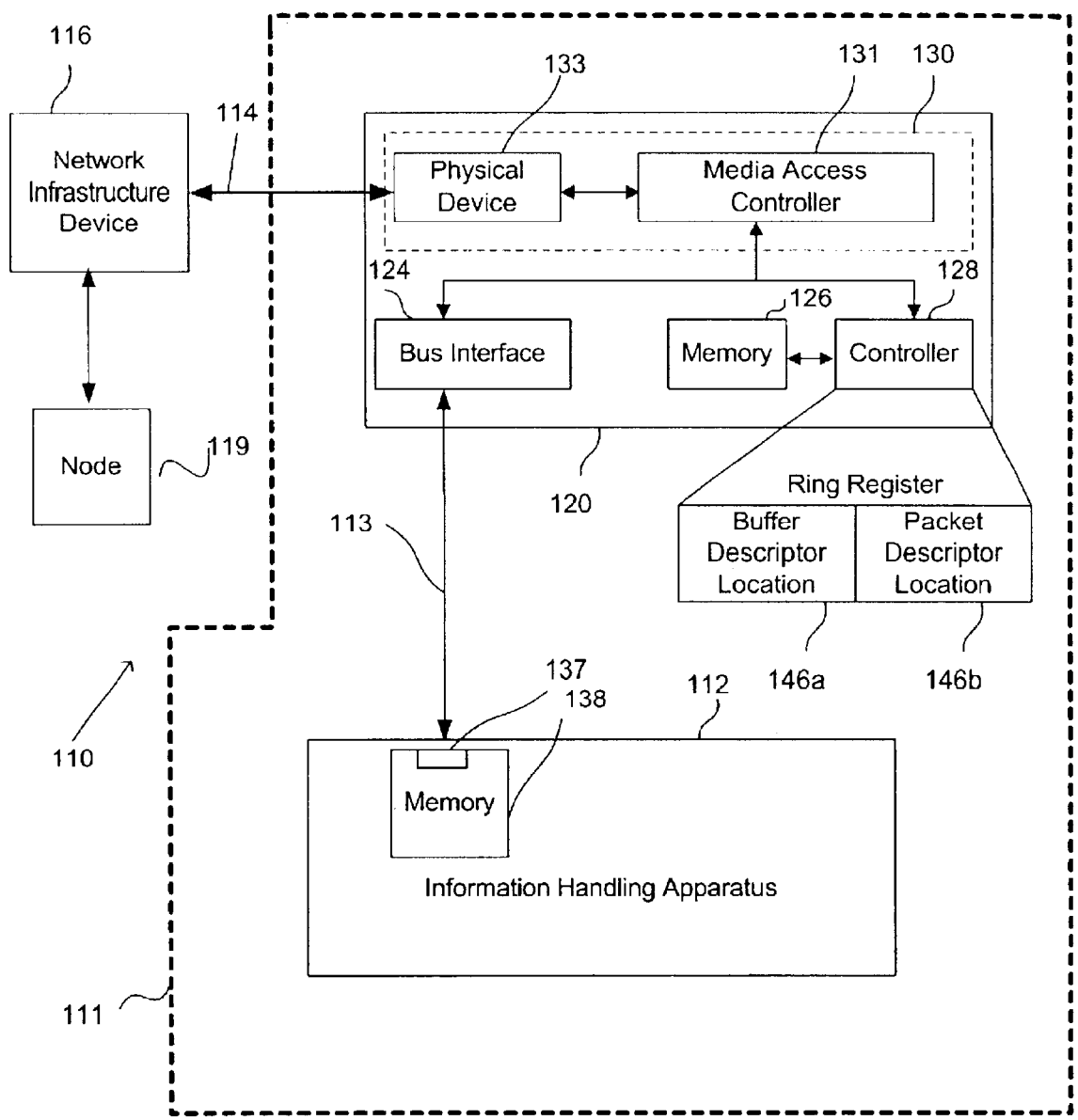
FIG. 1 is a block diagram illustrating an example of a communication network.

FIG. 1 is a block diagram illustrating an example of a communication network. The communication network 110 includes network nodes 111 and 119. The network node 111 may include, for example, a computing device 112 coupled via an I/O bus 113 to a network adapter 120. The computing device 112 may be any device, machine, computer or processor, such as one that handles, routes, or processes information. The network adapter 120 may be integrated into the network node 111 with the computing device 112. Alternatively, the network adapter 120 may be separate from the computing device 112. The network adapter 120 may comprise a single integrated circuit (IC), multiple ICs or may be integrated into circuitry within computing device 112.

The network adapter 120 may be coupled to the network node 119 via network media 114 and one or more network infrastructure devices (NIDs), such as NID 116. The NID 116 may comprise, for example, any device capable of routing, switching, repeating or passing data on a network, examples of which may include, without limitation, a router, server, switch and/or hub. The network media 114 refers to the medium or media through which signals are transferred or transmitted including, but not limited to, optical fiber, cables, and/or radio waves. The computing device 112 may include a host memory 138 that may have stored therein ingress packets and/or egress packets. As described above, egress packets are packets of data to be transferred or transmitted from the computing device 112 via the network media 114 to the NID 116 and to the network, and ingress packets are packets of data to be received by the computing device 112 via the network media 114 from the network.

Figure 2A:
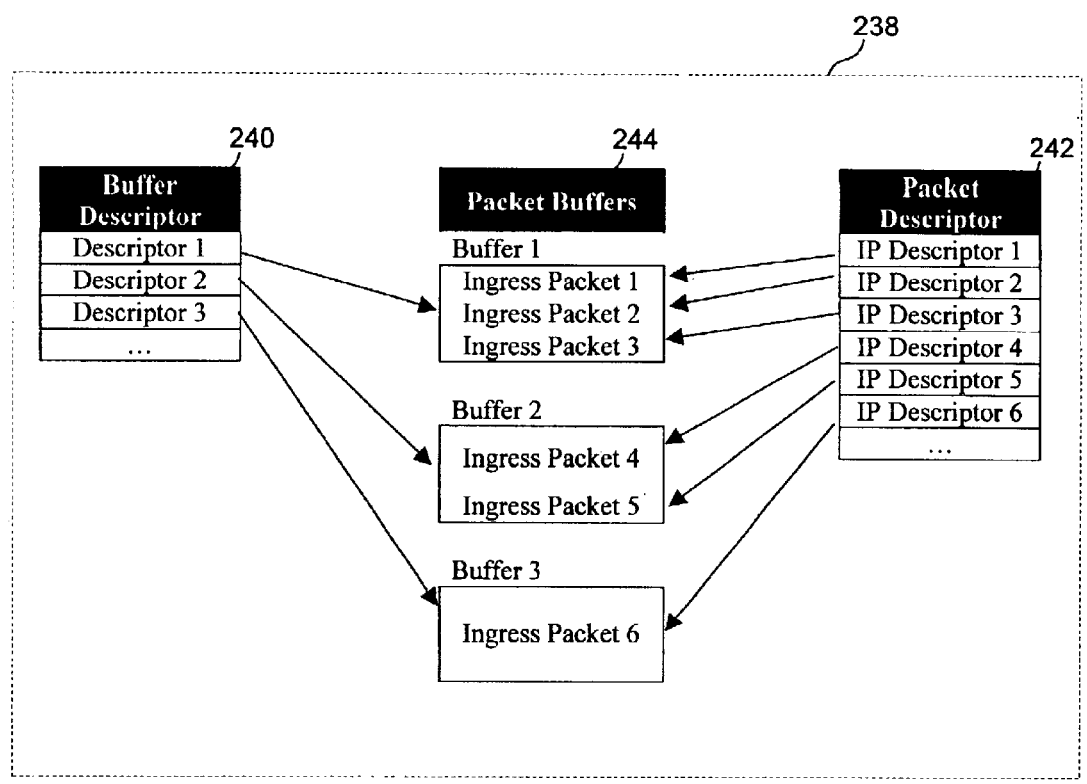
FIG. 2A is a block diagram illustrating examples of packet buffers and associated descriptors.

FIG. 2A is a block diagram illustrating examples of packet buffers and associated descriptors. The ingress packets that are received may be stored in packet buffers 244 (within the memory 138 in FIG. 1). The memory 138 may also contain buffer descriptors 240, and packet descriptors 242. The buffer descriptors 240 may be descriptors that indicate the locations of buffers in memory 138 allocated for ingress packet storage. The packet descriptors 242, on the other hand, may be descriptors that indicate those locations within the allocated buffers that contain the stored ingress packets.

The network adapter 120 may read data from the host memory 138 via the bus 113 and transfer such data as egress packets across the network media 114. Likewise, the network adapter 120 may receive data as ingress packets via network media 114 and may write the ingress packets into host memory 138 via the bus 113. The computing device 112 may include program code, including, but not limited to, an operating system (OS) and a device driver, such as device driver 137. Typically these instructions are stored in a memory, such as the host memory 138. Typically, the computing device 112, while executing the OS, may store data to be transmitted as egress packets in the host memory 138. The OS may thus provide an indication that such data is available for transfer. Of course, this is a description of only one possible embodiment and the claimed subject matter is not limited in scope to this particular embodiment.

The network adapter 120 may comprise multiple operational units. For example, the network adapter 120 may include a controller 128 that is coupled to a bus interface 124, a network adapter local memory 126 and a transceiver 130. The transceiver 130 may include a media access controller (MAC) or MAC layer 131 and a physical device or physical layer 133. The transceiver 130 may read egress packets stored in the local memory 126 and transmit the egress packets to the network via the network media 114. The transceiver 130 may store or write into the local memory 126 ingress packets received from the network media 114.

The controller 128 may include a computational device (not shown), such as, for example, but not limited to, a state machine, an arithmetic logic unit (ALU) or a processor that is capable of performing arithmetic computations. For one embodiment, the computational device may be employed to measure or estimate a volume of traffic passing through the network media 114. The controller 128 may monitor the network media 114 via the transceiver 130 and measure or estimate the volume of network traffic being transmitted and/or received. In this context, network traffic or network signal traffic refers to a measure of the utilization of the network for signal transmission by the devices coupled to it relative to the available bandwidth capability of the network. For example, one measure of network traffic may include the number of data packets that are passed via the network media 114 to and from the computing device 112 in a predetermined period of time, although other measures may also or alternatively be employed and are within the scope of the claimed subject matter.

The controller 128 may include the capability to read scatter-gather descriptors stored in the host memory 138 of the computing device 112. Scatter-gather descriptors, or, simply, descriptors, in this context, refer to data in stored in the host memory 138 that provides information about packets or data packets stored elsewhere in the host memory 138 that are to be transmitted to or that have been received from the network. These may be included in a table, although this is not necessary. The descriptors typically comprise details (e.g., address, length, control information, etc.) about the data packets. For example, a block of memory, referred to here as a buffer, may be allocated to store such data packets. These descriptors may thus include, for example, information about the location of the buffer in the host memory 138.

The network adapter 120 may read the descriptors to determine what memory transfer operations such as, for example, direct memory access (DMA) bus transactions, to perform in order to complete the desired transmit (egress) and/or receive (ingress) operation or operations. For example, the device driver 137 on the computing device 112 may form the scatter-gather descriptors to include the address, length, and control information about a packet or packets to be transmitted. By one of many possible methods, the controller 128 may fetch these descriptors and may then initiate memory transfers of data packets within buffers referenced by these scatter-gather descriptors.

During a memory transfer, such as by a DMA device, the computing device 112 may request control of the bus 113 and read a sequence of data from a buffer in the host memory 138 and write this data into the local memory 126 within the network adapter 120. After the data has been fetched, the controller 128 may then transfer the data packet or packets to the transceiver 130 for transmission to the network media 114 and to the network. For ingress operations, the device driver 137 may generate descriptors that indicate to the controller 128 available buffer locations within the host memory 138 of the computing device 112. The controller 128 may write the ingress packets into these buffers. After the memory or DMA transfer operation is complete, the controller 128 may update the descriptors to indicate to the device driver 137 the status of the data packet or packets that now occupy the buffers.

Scatter-gather descriptors may generally be placed in an array or linked list. The descriptors may typically be used in a circular fashion such as, for example, by reading a first descriptor, continuing to read the descriptors until a final one is read, then reading the first descriptor again. These groups of descriptors in this context are referred to as descriptor rings, although, of course, the claimed subject matter is not limited in scope to employing such rings. There may be separate rings for egress and ingress operations, although, again, the claimed subject matter is not limited in scope in this respect. An egress operation in this context refers to the data packet transmission process and an ingress operation in this context refers to the data packet reception process.

Referring to FIG. 1, the controller 128 may include a ring register, such as one that includes a buffer descriptor location register 146a and a packet descriptor location register 146b. The buffer descriptor location register 146a and packet descriptor location register 146b in this particular embodiment may include the length and address of buffer descriptors 240 and packet descriptors 242 within the memory 138. During operation, in this embodiment, the controller 128 may retrieve the buffer descriptors 240 via the bus interface 124. The buffer descriptors 240 here are retrieved from locations in the host memory 138 indicated by the buffer descriptor location register 146a. The controller 128 may then, in this embodiment, with a single memory transfer operation, quickly transfer multiple ingress packets from the local memory 126 and transfer these ingress packets into locations within the packet buffers 244 indicated by buffer descriptors 240. The controller 128 may then transfer, in this embodiment, using a single memory transfer operation, packet descriptors 242 into locations in the host memory 138 indicated by packet descriptor location register 146b to reflect the ingress packets just transferred to the host memory 138.

For one embodiment, the controller 128 may determine a "light" network traffic condition such as, for example, when the measured volume of network traffic is below a predetermined threshold. The controller 128 may also determine a "heavy" network traffic condition such as, for example, when the measured volume of network traffic exceeds such a predetermined threshold. The predetermined threshold may be set or determined by any one of a number of methods or techniques, such as by the user, at the factory, or computed by the network adapter or the computing device in real-time, for example. Again, this is intended simply as an example of a possible embodiment and the claimed subject matter is not limited in scope in this respect.

Figure 2B:
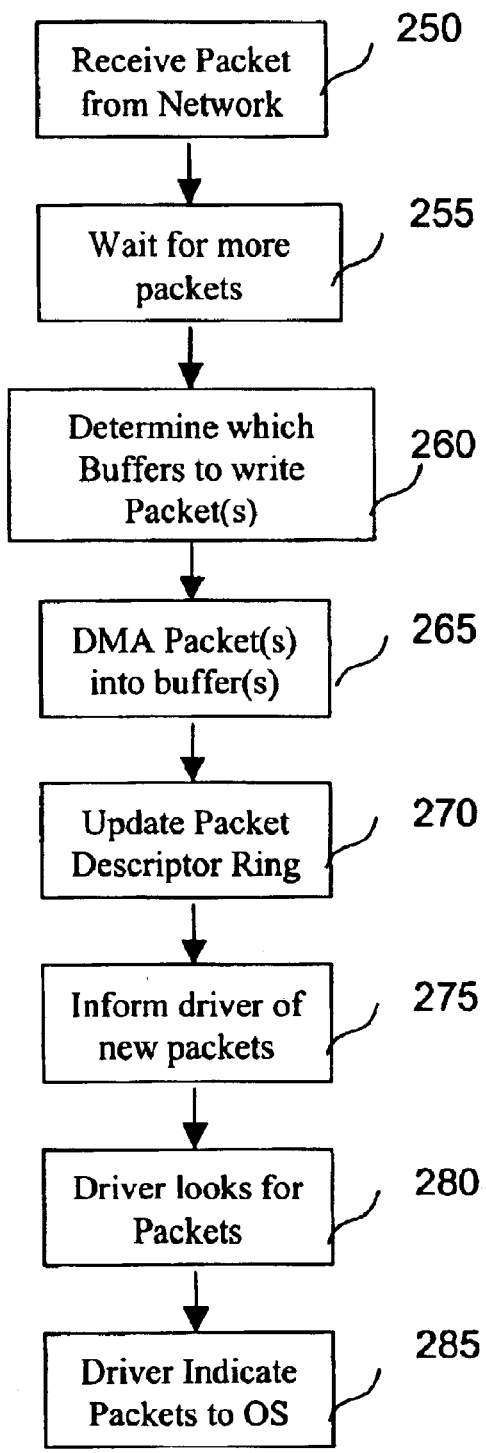
FIG. 2B is a flow diagram illustrating one embodiment of a method for reception of an ingress packet.

Although not limited in scope in this respect, FIG. 2B is a flow diagram illustrating one embodiment of a method for reception of an ingress packet. In block 250, the transceiver 130 may receive an ingress packet via the network media 114. The controller 128 may transfer the received ingress packet into the local memory 126. The controller 128 in block 255 may delay starting a memory transfer operation that transfers the received ingress packet located within the local memory 126 to the host memory 138 to allow several ingress packets to be received and stored in the local memory 126. In block 260, the controller 128 may determine the buffers in packet buffers 244 to store the received ingress packet(s). To do this, the controller 128 may determine the remaining space available in the memory locations indicated by the buffer descriptors 240 and how to accommodate the received packet(s). For example, the controller 128 may determine to either write a portion of an ingress packet to the current buffer and the remainder of the ingress packet to the next available buffer, or may determine to transfer a packet to the next available buffer within packet buffers 244.

In block 265, the controller 128 using a memory transfer operation may transfer one or more of the received ingress packets into packet buffers 244. Subsequent ingress packets may not necessarily be received by the transceiver 130 immediately after the first ingress packet is received. The controller 128 may, therefore, use a memory transfer operation to transfer ingress packets in the local memory 26 to a buffer containing no ingress packets within packet buffers 244 before utilizing a buffer containing ingress packets within packet buffers 244 to store additional ingress packets, although the claimed subject matter is not limited in scope in this respect.

As indicated previously, for one embodiment, the controller 128 may monitor the quantity of network signal traffic via the network media 114, such as via the MAC 131, for example. The controller 128 may determine when the quantity of such network signal traffic falls below a predetermined threshold and, in response thereto, may limit to the number of ingress packets to be transferred from the network adapter 120 to the computing device 112 to the number of available buffers indicated by the buffer descriptors 240.

Under light network traffic conditions, such as where a predetermined threshold is not exceeded, for example, the controller 128 may, using a memory transfer operation, transfer one ingress packet to one buffer within the packet buffers 244. If the controller 128 determines that the measured volume of network traffic exceeds a predetermined threshold, such as in heavy network traffic conditions, it may group several ingress packets together in the local memory 126 and use a memory transfer operation to transfer multiple ingress packets to one buffer within the packet buffers 244.

In block 270, the controller 128 may transfer, using a memory transfer operation, the descriptors for the stored ingress packets, including ingress packet length and location within the packet buffers 244, into the packet descriptors 242. Likewise, for one embodiment, the controller 128 may include within the status information of a packet descriptor an indication of usage of the packet buffers 244. An example of such an indication of buffer usage may include a packet buffer flag that indicates that a following ingress packet was placed in a next buffer within the packet buffers 244, although the claimed subject matter is not limited in scope in this respect.

In block 275, the controller 128 may send an interrupt to the computing device 112 via the bus 113 to inform the computing device 112 that the received ingress packets have been transferred into the packet buffers 244. The computing device 112 may respond to the interrupt by reading an interrupt register on the controller 128 to determine the cause of the interrupt. Alternately, the computing device 112 may periodically poll the host memory 138 to determine that the received ingress packets have been transferred into the packet buffers 244.

In block 280, the computing device 112 may examine the packet descriptors 242. In block 285, the computing device 112 may provide the locations of the ingress packets in the packet buffers 244 to its OS. The OS may then provide an indication to the device driver 137 that one or more of buffers within the packet buffers 244 are available for storage of more ingress packets. The device driver 137 may wait for an indication that all the buffers in the packet buffers 244 are available for transfer of more ingress packets before providing an indication to the controller 128 that buffers are available for use by subsequent ingress packets. Alternatively, the device driver 137 may track how many ingress packets are transferred to the packet buffers 244 and which buffers within the packet buffers 244 are available to receive more ingress packets.

For one embodiment, the controller 128 may determine a number of ingress packets received condition such as, for example, when the number of ingress packets received in the local memory 126 is at a packet threshold, the controller initiates a single transfer operation to transfer the ingress packets from the local memory 126 to the host memory 138. Alternatively, instead of determining the number of ingress packets, the controller 128 may determine a number of bytes associated with the ingress packets such as, for example, when the number of bytes is at a byte threshold, the transfer operation is performed.

For another embodiment, the controller 128 may use dual timers to determine when to initiate the transfer operation such as, for example, when the traffic condition is light that the time between receiving ingress packets is so long that it may be preferable to perform the transfer operation rather than waiting for other condition to occur. For example, a first timer may be started when a first ingress packet is received by the controller 128. The first timer is not restarted until a transfer operation is performed by the controller 128. A second timer may be started when the first ingress packet is received by the controller. The second timer is restarted each time another ingress packet is received. The second timer may expire earlier than the first timer.

The first timer is also referred to as an absolute timer because it protects the first packet from having to wait for an excessively long time before being transferred. Expiration of the first timer triggers the controller 128 to perform the transfer operation. The second timer is also referred to as a packet timer because it is restarted by the reception of a new ingress packet. When the traffic condition results in periods of little or no ingress packets, the second timer protects the ingress packets in the buffer from having to wait excessively for another ingress packet or for the first timer to expire. For one embodiment, the absolute timer, the packet timer, and the packet threshold may be used together to determine when the transfer operation is to occur.

Figure 3:
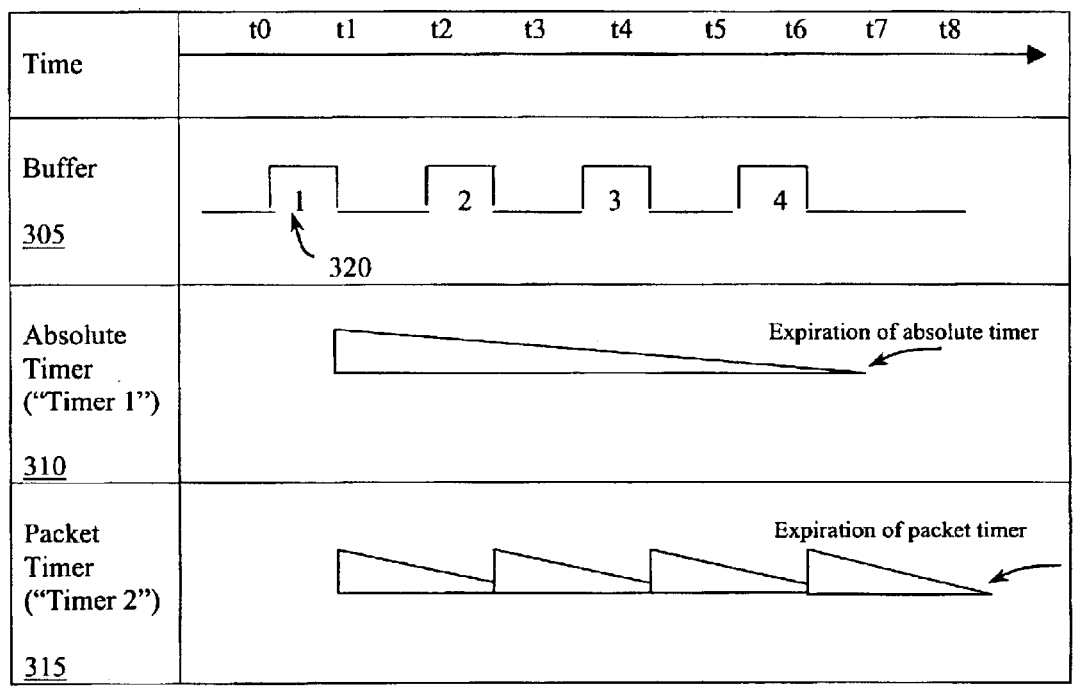
FIG. 3 is a block diagram illustrating an example of expiration of the absolute timer and triggering the controller to perform a transfer operation in accordance with one embodiment of the present invention.

FIG. 3 is a block diagram illustrating an example of expiration of the absolute timer and triggering the controller to perform a transfer operation in accordance with one embodiment of the present invention. In this example, the ingress packet threshold may be set at five (5), although, of course, other threshold may also be used. At time t6, four (4) ingress packets have been received into the buffer 305, and both the absolute timer (or timer 1) 310 and the packet timer (or timer 2) 315 have not expired. At time t7, no new ingress packet is received into the buffer 305 and, therefore, the number of ingress packets received has not reached the threshold. Also, at the time t7, expiration of the packet timer 315 has not occurred and, therefore, the controller 128 may not perform a transfer operation based on the expiration of the packet timer 315. However, at the time t7, the absolute timer 310 expires. The expiration of the absolute timer 310 triggers the controller 128 to transfer the four (4) ingress packets waiting in the buffer 305, even though the threshold has not been reached. The absolute timer 310 protects the first ingress packet 320 from waiting in the buffer 305, for example, for longer than the time it takes for the absolute timer 310 to expire. The absolute timer 310 may, for example, be set so that it may expire after the threshold is reached in heavy traffic condition.

Figure 4:
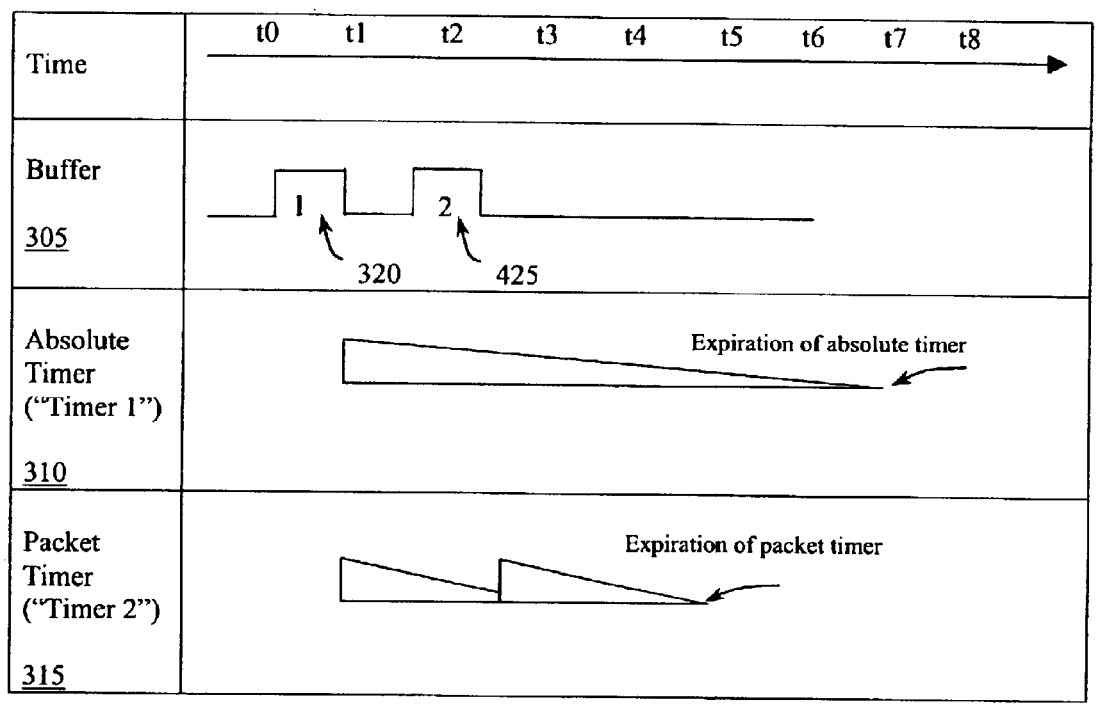
FIG. 4 is a block diagram illustrating an example of expiration of the packet timer and triggering the controller to perform a transfer operation in accordance with one embodiment of the present invention.

FIG. 4 is a block diagram illustrating an example of expiration of the packet timer and triggering the controller to perform a transfer operation in accordance with one embodiment of the present invention. In this example, the threshold may be set at five (5). At time t4, two (2) ingress packets have been received into the buffer 305, and both the absolute timer 310 and the packet timer 315 have not expired. At time t5, no new ingress packet is received into the buffer 305 and, therefore, the number of ingress packets received has not reached the threshold. Also, at the time t5, expiration of the absolute timer 310 has not occurred and, therefore, the controller 128 may not perform a transfer operation based on the expiration of the absolute timer 310. However, at the time t5, the packet timer 315 expires. The expiration of the packet timer 315 triggers the controller 128 to transfer the two (2) ingress packets waiting in the buffer 305, even though the threshold has not been reached. The packet timer 315 may protect the first ingress packet 320 and the second ingress packet 425 from waiting in the buffer 305, for example, for longer than the time it takes for the packet timer 315 to expire. The packet timer 315 may be set, for example, so that it may expire, before the expiration of the absolute timer 310. The packet timer 315 may also be set, for example, so that it may expire after a length of time that a new ingress packet is expected to be received into the buffer 305 in normal traffic condition.

Figure 5:
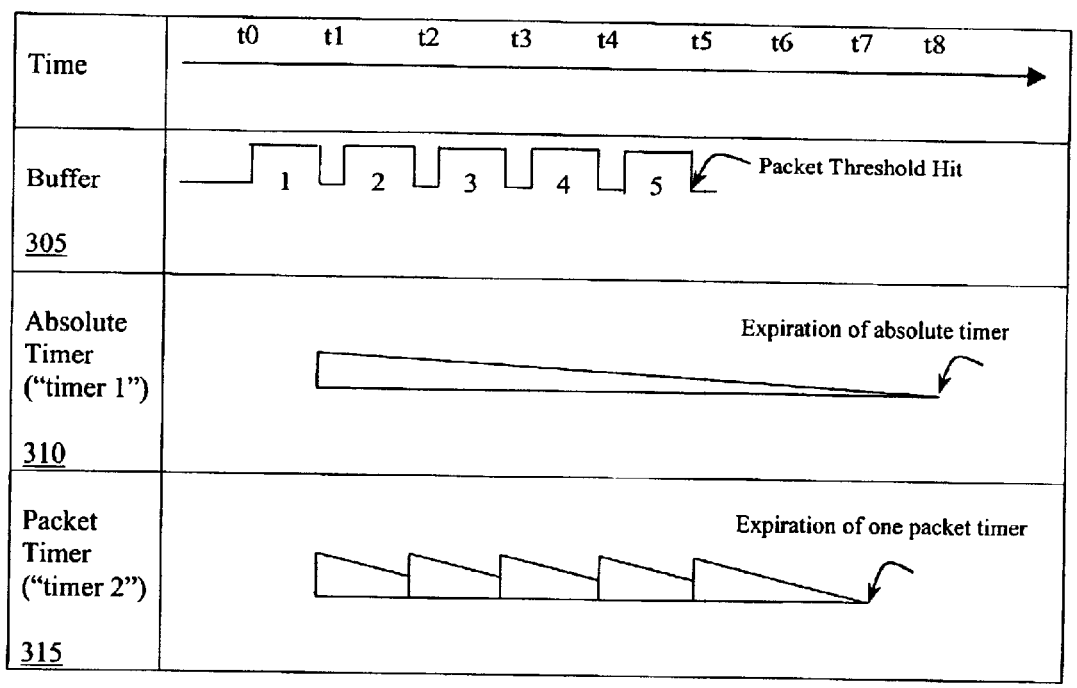
FIG. 5 is a block diagram illustrating an example of reaching the packet threshold and triggering the controller to perform a transfer operation in accordance with one embodiment of the present invention.

FIG. 5 is a block diagram illustrating an example of reaching the packet threshold and triggering the controller to perform a transfer operation in accordance with one embodiment of the present invention. In this example, the threshold may be set at five (5). At time t4, two (2) ingress packets have been received into the buffer 305, and both the absolute timer 310 and the packet timer 315 have not expired. At time t5, expiration of the absolute timer 310 has not occurred and, therefore, the controller 128 may not perform a transfer operation based on the expiration of the absolute timer 310. Also, at the time t5, expiration of the packet timer 315 has not occurred and, therefore, the controller 128 may not perform a transfer operation based on the expiration of the packet timer 315. However, at the timer t5, the number of ingress packets received into the buffer is at five (5), the same as the packet threshold. Because the packet threshold is reached, this triggers the controller 128 to transfer the five (5) ingress packets waiting in the buffer 305, even though the expiration of the absolute timer 310 and the packet timer 315 have not occurred. The packet threshold may allow the ingress packets in the buffer to be transferred quickly in heavy traffic condition.

Figure 6:
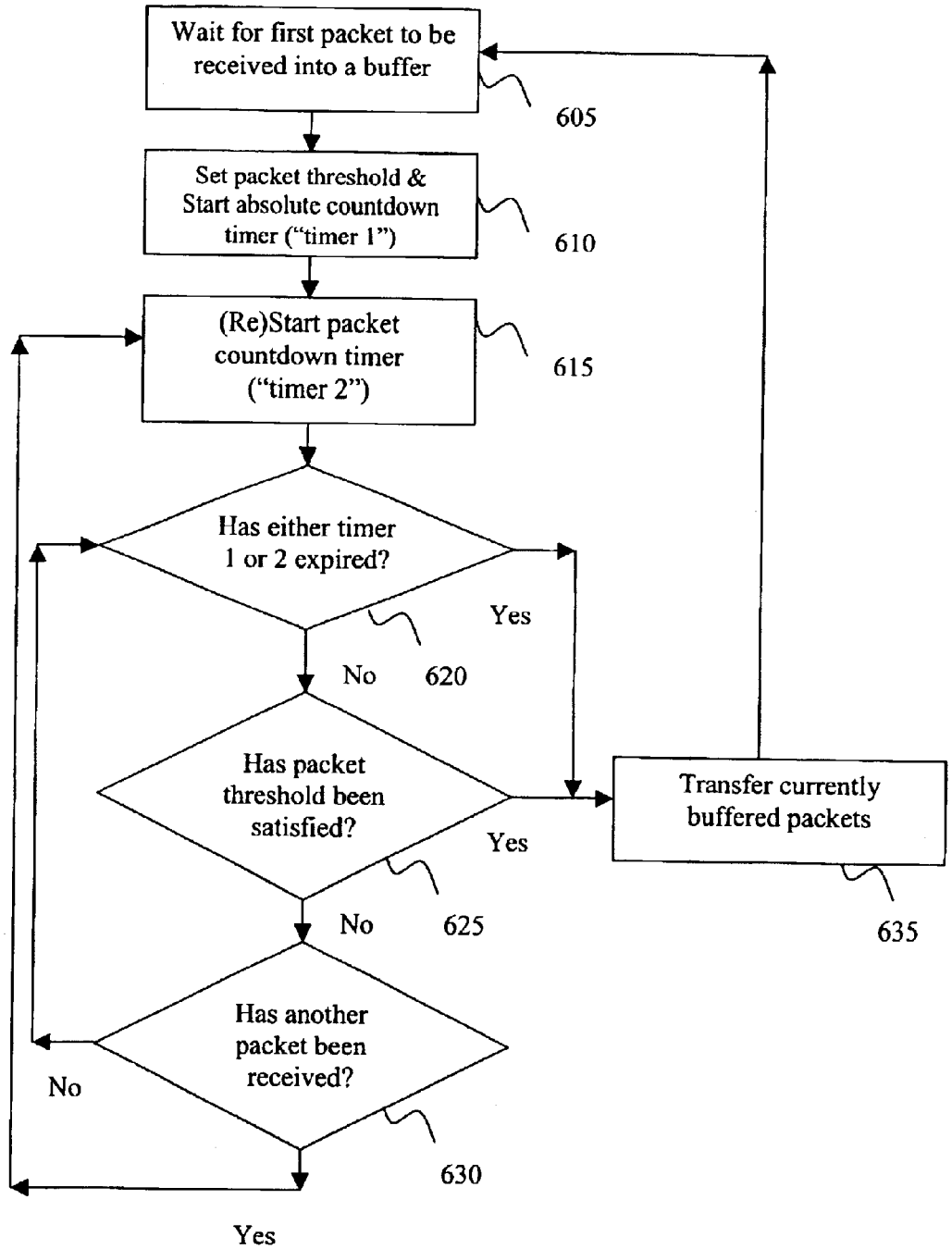
FIG. 6 is a flow diagram illustrating a transfer operation decision process in accordance with one embodiment of the present invention.

FIG. 6 is a flow diagram illustrating a transfer operation decision process in accordance with one embodiment of the present invention. The process assumes that the buffer 305 is empty and is waiting to receive a first ingress packet, as shown in block 605. If the first ingress packet is received, the absolute timer 310 is started, as shown in block 610. The packet threshold may be set at this time, although it may also be set before starting the absolute timer 310. At block 615, the packet timer 315 is started. Note that, as described above, the packet timer 315 is restarted each time a new ingress packet is received into the buffer 305.

At block 620, a determination is made to find out if expiration of either of the absolute timer 310 or the packet timer 315 has occurred. If yes, the process flows from block 620 to block 635 where the ingress packets in the buffer 305 are transferred. The process then flows back to block 605 to prepare for a next transfer operation. From block 620, if neither one of the absolute timer 310 or the packet timer 315 has expired, the process flows to block 625. At block 625, a determination is made to find out if the packet threshold has been met. If yes, the process flows from block 620 to block 635 where the ingress packets in the buffer 305 are transferred. The process then flows back to block 605 to prepare for a next transfer operation. From block 625, if the packet threshold has not been met, the process flows to block 630. At block 630, a determination is made to find out if a new ingress packet has been received. If yes, the process flows from block 630 to block 615 where the packet timer 315 is restarted. If no new ingress packet has been received, the process flows from block 630 back to block 620 to check for the expiration of the absolute timer 310 and the packet timer 315, as described above.

The operations of these various methods may be implemented by a processor in a computer system, which executes sequences of computer program instructions which are stored in a memory which may be considered to be a machine-readable storage media. For example, the computer system may be the network-adapter 120 illustrated in FIG. 1. The memory may be random access memory (RAM), read only memory (ROM), a persistent storage memory, such as mass storage device or any combination of these devices. Execution of the sequences of instruction causes the processor to perform operations according to one embodiment the present invention such as, for example, the operations described in FIG. 6.

In the preceding description, various aspects of the claimed subject matter have been described. For purposes of explanation, specific numbers, systems and configurations were set forth in order to provide a thorough understanding of the claimed subject matter. However, it is apparent to one skilled in the art having the benefit of this disclosure that the claimed subject matter may be practiced without the specific details. In other instances, well-known features were omitted or simplified in order not to obscure the claimed subject matter.

What is claimed is:

1. A method, comprising:

using a first timer to time a first length of time, wherein if the first timer expires, one or more packets in a buffer are transferred; wherein the first timer is restarted after the one or more packets are transferred and not restarted when a new packet is received into the buffer; and using a second timer to time a second length of time, wherein if the second timer expires before the new packet is received into the buffer, the one or more packets in the buffer are transferred; and restarting the second timer after the new packet is received into the buffer and before expiration of the second timer.

2. The method of claim 1, wherein the first length of time is at least as long as the second length of time.

3. The method of claim 1, wherein if the second timer does not expire and the first timer expires, the one or more packets in the buffer are transferred.

4. The method of claim 1, wherein if the first timer does not expire and the second timer expires, the one or more packets in the buffer are transferred.

5. The method of claim 1, further comprising:

keeping track of a number of packets in the buffer, wherein if the number of packets in the buffer satisfies a threshold before expiration of the first timer or the second timer, the one or more packets in the buffer are transferred.

6. An apparatus, comprising:

a first timer, wherein expiration of the first timer is to cause one or more packets in a buffer to be transferred, wherein the first timer is not restarted if a packet is being received into the buffer; and a second timer coupled to the first timer, wherein expiration of the second timer before the packet is received into the buffer causes the one or more packets in the buffer to be transferred; and wherein the second timer is restarted if the new packet is received into the buffer before the expiration of the second timer.

7. The apparatus of claim 6, wherein if the first timer expires and the second timer does not expire, the one or more packets in the buffer are transferred.

8. The apparatus of claim 6, wherein if the second timer expires and the first timer does not expire, the one or more packets in the buffer are transferred.

9. The apparatus of claim 6, wherein the first timer is restarted after the one or more packets in the buffer are transferred.

10. A system, comprising:

a processor;

a memory coupled to the processor;

a controller coupled to the memory and the processor, the controller to determine when to transfer data packets in a buffer using a first timer and a second timer, wherein if the first timer expires the controller is to transfer the data packets in the buffer, wherein the first timer is not restarted when a packet is received into the buffer, and wherein if the second timer expires before a new data packet is received into the buffer, the controller is to transfer the data packets in the buffer; and to restart the second timer after the new packet is received into the buffer and before expiration of the second timer.

11. The system of claim 10, wherein the controller is to transfer the data packets in the buffer if the first timer expires and the second timer does not expire.

12. The system of claim 10, wherein the controller is to transfer the data packets in the buffer if the second timer expires before the new data packet is received into the buffer even if the first timer does not expire.

13. The system of claim 10, wherein the controller further is to transfer the data packets in the buffer when a number of data packets in the buffer satisfy a threshold.

14. The system of claim 13, wherein the controller is to transfer the data packets in the buffer when the number of data packets in the buffer satisfies the threshold before expiration of the first timer or the second timer.

15. An integrated circuit, comprising:

a controller operative to receive one or more ingress packets and to store the one or more ingress packets in one or more memory locations, wherein the controller is to perform a single memory transfer operation to transfer the one or more ingress packets if a first timer expires or if a second timer expires before a new ingress packet is received by the controller, wherein the first timer is not restarted when the new ingress packet is received into the buffer and is restarted after the transfer operation and the second timer is restarted when the new ingress packet is received by the controller and before expiration of the second timer.

16. The integrated circuit of claim 15, wherein the memory transfer operation comprises a direct memory access (DMA) bus transaction.

17. The integrated circuit of claim 15, wherein the controller performs the memory transfer operation when a number of ingress packets received by the controller satisfies a packet threshold.

18. An article of manufacture, comprising:

a machine-accessible medium including data that, when accessed by a machine, cause the machine to performs operations comprising:

transferring one or more packets in a buffer if a first timer expires;

transferring the one or more packets in the buffer if a second timer expires before a new packet is received into the buffer, wherein the first timer is not restarted when the new packet is received into the buffer; and transferring the one or more packets in the buffer if a number of packets in the buffer reaches a threshold and even if the first timer and the second timer do not expire.

19. The article of manufacture of claim 18, wherein if first timer expires and the second timer does not expire, the one or more packets in the buffer are transferred.

20. The article of manufacture of claim 18, wherein if the second timer expires and the first timer does not expire, the one or more packets in the buffer are transferred.

* * * * *